(12) United States Patent  
Liau et al.

(10) Patent No.: US 11,664,924 B2  
(45) Date of Patent: May 30, 2023

(54) EFFICIENT ADAPTIVE CODING AND MODULATION

(71) Applicant: Hughes Network Systems, LLC, Germantown, MD (US)

(72) Inventors: Victor Liau, Gaithersburg, MD (US); Lin-nan Lee, Potomac, MD (US); Mustafa Rangwala, New Market, MD (US); Sarah Xie, North Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 486 days.

(21) Appl. No.: 16/589,555

(22) Filed: Oct. 1, 2019

(65) Prior Publication Data

US 2021/0099247 A1   Apr. 1, 2021

(51) Int. Cl.
*H04L 1/00* (2006.01)
*H04B 7/185* (2006.01)
*H04B 17/336* (2015.01)

(52) U.S. Cl.
CPC ....... *H04L 1/0005* (2013.01); *H04B 7/18528* (2013.01); *H04B 17/336* (2015.01); *H04L 1/003* (2013.01); *H04L 1/0025* (2013.01); *H04L 1/0061* (2013.01)

(58) Field of Classification Search
CPC .............. H04B 7/18528; H04B 17/336; H04B 7/1851; H04L 1/0016; H04L 1/0025; H04L 1/003; H04L 1/0009; H04L 1/0005
See application file for complete search history.

(56) References Cited

U.S. PATENT DOCUMENTS

2012/0106450 A1* 5/2012 Golitschek Edler Von Elbwart ................. H04L 1/003 370/328

2018/0183545 A1* 6/2018 Subramaniam .... H04B 7/18543
(Continued)

FOREIGN PATENT DOCUMENTS

| CN | 101682467 | * | 3/2010 | ......... H04L 27/2608 |
| CN | 1615624 | * | 8/2012 | .......... H04L 1/0021 |

(Continued)

OTHER PUBLICATIONS

PCT International Search Report and Written Opinion in International Appln. No. PCT/US2020/050214, dated Nov. 27, 2020, 13 pages.

(Continued)

*Primary Examiner* — Phong La (74) *Attorney, Agent, or Firm* — Fish & Richardson P.C.

(57) ABSTRACT

Methods, systems, and apparatus, including computer programs encoded on computer-storage media, for determining a set of communication parameters for receiving data transmissions. In some implementations, a method includes receiving a first data transmission sent according to a first communication parameter scheme that includes at least one of a first modulation or a first coding. A second data transmission is received. A second communication parameter scheme of the second transmission is determined. This determination includes identifying a subset of multiple candidate communication parameter schemes determined based on the first communication parameter scheme, identifying, in the second data transmission, a first identifier that corresponds to the second communication parameter scheme, comparing the first identifier to a respective identifier for each communication parameter scheme in the subset, and determining, as the second communication parameter scheme, a communication parameter scheme in the subset that has an identifier that matches the first identifier.

20 Claims, 5 Drawing Sheets

(56) References Cited

U.S. PATENT DOCUMENTS

| | | | | |
|---|---|---|---|---|
| 2018/0278324 A1* | 9/2018 | Qin | ................ | H04L 1/0009 |
| 2019/0132044 A1 | 5/2019 | Hreha et al. | | |
| 2021/0006963 A1* | 1/2021 | Chauhan | ................ | H04L 5/003 |
| 2021/0099247 A1* | 4/2021 | Liau | ................ | H04B 17/336 |

FOREIGN PATENT DOCUMENTS

| | | | | |
|---|---|---|---|---|
| CN | 102017524 | * | 4/2014 | ........... H04B 7/0452 |
| CN | 104468048 | * | 3/2015 | ........... H04L 1/0003 |
| CN | 109075952 | * | 12/2018 | ........... H04L 5/0091 |

OTHER PUBLICATIONS comtechefdata.com [online] "Adaptive Coding and Modulation (ACM) in the CDM-625 Advanced Satellite Modem," Jun. 2009, Retrieved from URL <http://www.comtechefdata.com/files/articles_papers/wp-cdm625_acm_white_paper.pdf> on Sep. 30, 2019, 14 pages.

comtechefdata.com [online] "Adaptive Coding and Modulation (ACM)," 2019, Retrieved from URL <https://www.comtechefdata.com/technologies/acm> on Sep. 30, 2019, 3 pages.

Hughes.com [online] "Jupiter System Bandwidth Efficiency," Nov. 2015, Retrieved from URL <https://www.hughes.com/sites/hughes.com/files/2017-04/JUPITER-System_Bandwidth-Efficiency_H55626_HR.pdf> on Sep. 30, 2019, 7 pages.

telesat.com [online] "Briefing on Adaptive Coding and Modulation," Sep. 2010, Retrieved from URL <https://www.telesat.com/sites/default/files/telesat/files/whitepapers/ACM.pdf> on Sep. 30, 2019, 5 pages.

International Preliminary Report on Patentability in International Appln. No. PCT/US2020/050214, dated Apr. 14, 2022, 8 pages.

\* cited by examiner

EFFICIENT ADAPTIVE CODING AND MODULATION

TECHNICAL FIELD

The present specification relates to techniques for determining a set of communication parameters for receiving satellite transmissions.

BACKGROUND

Adaptive Coding and Modulation (ACM) is a technology that compensates for changes in the conditions of wireless links by adjusting the modulation and the Forward Error Correction (FEC) code rate. For example, ACM can adjust a link to a more robust modulation and code rate in rain or other degraded conditions and adjust to a less robust and higher throughput modulation and code rate in clear conditions.

Typically, to span a broad range of SNRs, a large set of code rates are used. To operate autonomously, the receiver must be able to detect which communication parameter scheme the received signal has been transmitted. One detection technique is to associate a unique word with each code rate and transmit it along with a frame of coded data. The receiver detects the unique word in the transmission and correlates the detected unique word against all of the unique words associated with every possible code rate. This places a large burden on the receiver's acquisition function to search over many unique words, heavily utilizing both time and hardware resources.

SUMMARY

In some implementations, a communication system includes features that reduce the burden on receivers to determine a communication parameter scheme for a data transmission. The communication parameter scheme can include a modulation, a coding, and/or a symbol rate used to transmit data. A controller can change the communication parameter scheme based on link conditions, e.g., based on a signal-to-noise ratio (SNR) of data transmissions that have been transmitted on the link. A data transmission can include an identifier, e.g., a unique word or other unique pattern, that corresponds to the communication parameter scheme for the data transmission.

The burden on the receiver can be reduced by limiting the number of communication parameter schemes that the receiver has to consider for each data transmission. For example, the receiver may only compare the identifier for a received data transmission to the identifiers for a subset of the possible communication parameter schemes. In some implementations, the subset is determined based on the communication parameter scheme used for previous data transmissions from a transmitter to the receiver. For example, various communication parameter schemes can be ranked, and a controller can be configured to only move up or down one communication parameter scheme in the ranking in response to a change in SNR. For example, an arrangement of communication parameter schemes may be ranked based on the SNR that the communication parameter schemes can tolerate and/or data throughput of the schemes. In this example, the subset of schemes to consider would include the previous communication parameter scheme used in the previous transmission(s), the communication parameter scheme directly below the previous communication parameter scheme (e.g., the next more robust scheme), and the communication parameter scheme directly above the previous communication parameter scheme (e.g., the next less robust scheme). This subset can also include the most robust communication parameter scheme as a fallback so that the transmitter and receiver can resynchronize quickly if link conditions deteriorate quickly.

In some implementations, before changing communication parameter schemes, the transmitter can send a communication to the receiver that notifies the receiver of an upcoming change in the communication parameter scheme to be used for later transmissions. After some time, the transmitter can change from a current communication parameter scheme to the next communication parameter scheme. Because the receiver knows the next communication parameter scheme in advance of the change, the receiver can compare the identifier for each data transmission to the identifiers for only two communication parameter schemes, the current one and the next one. The controller can use software to determine the next communication parameter scheme based on SNR such that the next communication scheme can be any of the multiple different communication parameter schemes for which the transmitter and receiver are configured to communicate.

By limiting the number of communication parameter schemes that a receiver has to consider, the hardware requirements and complexity of the receiver can be reduced while still allowing dynamic changes in modulation, coding, and/or symbol rate using ACM. For example, the receiver may operate without using a hardware correlator device to assess the applicability of many different modulation and coding schemes. Similarly, a receiver implemented with a field-programmable gate array (FPGA) may be implemented with a much smaller FPGA, because fewer logic gates are needed to check for fewer different communication schemes. As discussed further below, receivers can be implemented so that they check for no more than four different communication parameter schemes, or even no more than two communication parameter schemes. As each unique word pattern that a receiver must detect can represent a dot product operation, fewer unique words results in fewer dot product operations that must be performed by the receiver. This saves time and resources such as multipliers and adders, e.g., if the dot product operations are performed concurrently. In addition, the receiver can detect the communication parameter scheme faster using fewer hardware resources, resulting in the data of the data transmission being decoded faster, even when link conditions are changing rapidly or with severe interferers on the link. This also enables the transmitter and receiver to dynamically adapt quickly and autonomously to severe interference (e.g., on a contested environment) or unstable conditions that change rapidly.

In one general aspect, the techniques disclosed herein describe methods of determining a set of communication parameters for receiving data transmissions. According to some of the methods, a first data transmission sent over a link is received. The first data transmission is sent according to a first communication parameter scheme that includes at least one of a first modulation or a first coding. A second data transmission is received. In response to receiving the second data transmission, a second communication parameter scheme of the second transmission is determined. This determination can include identifying a subset of multiple candidate communication parameter schemes determined based on the first communication parameter scheme, identifying, in the second data transmission, a first identifier that corresponds to the second communication parameter scheme, comparing the first identifier to a respective identifier for each communication parameter scheme in the subset of candidate communication parameter schemes, and determining, as the second communication parameter scheme and based on the comparison, a communication parameter scheme in the subset that has an identifier that matches the first identifier. Data is obtained from the data transmission based on the second communication parameter scheme.

In some implementations, the first data transmission and the second data transmission are satellite transmissions. Each communication parameter scheme can include a modulation and a coding corresponding to a forward error correction coding of the link. The first communication parameter scheme and the second communication parameter scheme can have different modulations. The first communication parameter scheme and the second communication parameter scheme can have different codings. Each communication parameter scheme can include a symbol rate. The first communication parameter scheme and the second communication parameter scheme can have different symbol rates. In some implementations, the identifier is a unique word comprising a pattern of symbols.

In some implementations, each communication parameter scheme in the multiple candidate communication parameter schemes corresponds to a signal-to-noise threshold. The multiple candidate communication parameter schemes are ranked according to the signal-to-noise ratio thresholds. The subset of candidate communication parameter schemes can be limited to, the first communication parameter scheme, a higher-ranked communication parameter scheme ranked higher than the first communication parameter scheme in the ranking, and a lower-ranked communication parameter scheme that is ranked lower than the first communication parameter scheme in the ranking. The second communication parameter scheme is the higher-ranked communication parameter scheme or the lower-ranked communication parameter scheme.

In some implementations, each communication parameter scheme in the multiple candidate communication parameter schemes corresponds to a signal-to-noise threshold. The multiple candidate communication parameter schemes are ranked according to the signal-to-noise ratio thresholds. The subset of candidate communication parameter schemes is limited to the first communication parameter scheme, a higher-ranked communication parameter scheme that is ranked higher than the first communication parameter scheme in the ranking, a lower-ranked communication parameter scheme that is ranked lower than the first communication parameter scheme in the ranking, and a default communication parameter scheme. The second communication parameter scheme is the higher-ranked communication parameter scheme, the lower-ranked communication parameter scheme, or the default communication parameter scheme. The default communication parameter scheme can correspond to a lowest signal-to-noise ratio threshold of the multiple candidate communication parameter schemes.

Some implementations can include determining, based on a signal-to-noise ratio for the first data transmission, to switch from the first communication parameter scheme to the second communication parameter scheme and providing, to a transmitter, data instructing the transmitter to switch to the second communication parameter scheme. The subset of candidate communication parameter schemes can include only the first data communication scheme and the second data communication scheme. The subset of candidate communication schemes can include a third communication parameter scheme that corresponds to a lowest signal-to-noise ratio of the multiple candidate communication parameter schemes. A software application determines the second communication parameter scheme based on the signal-to-noise ratio of the first data transmission and configures a receiver to compare the identifier to an identifier for the second communication parameter scheme.

In some implementations, the subset of candidate communication parameter schemes includes no more than four communication parameter schemes. The first communication parameter scheme can be different from the second communication parameter scheme.

In some implementations, a receiver that receives the first data transmission and the second data transmission is part of a communication terminal. The second communication parameter scheme may not be requested by the communication terminal. The communication terminal may not be notified of a switch to the second communication parameter scheme by a transmitter before the second data transmission is sent by the transmitter. The transmitter transmits, to the receiver, the first data transmission and the second data transmission.

In some implementations, each communication parameter scheme includes at least one of a spreading factor and/or a roll-off factor.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
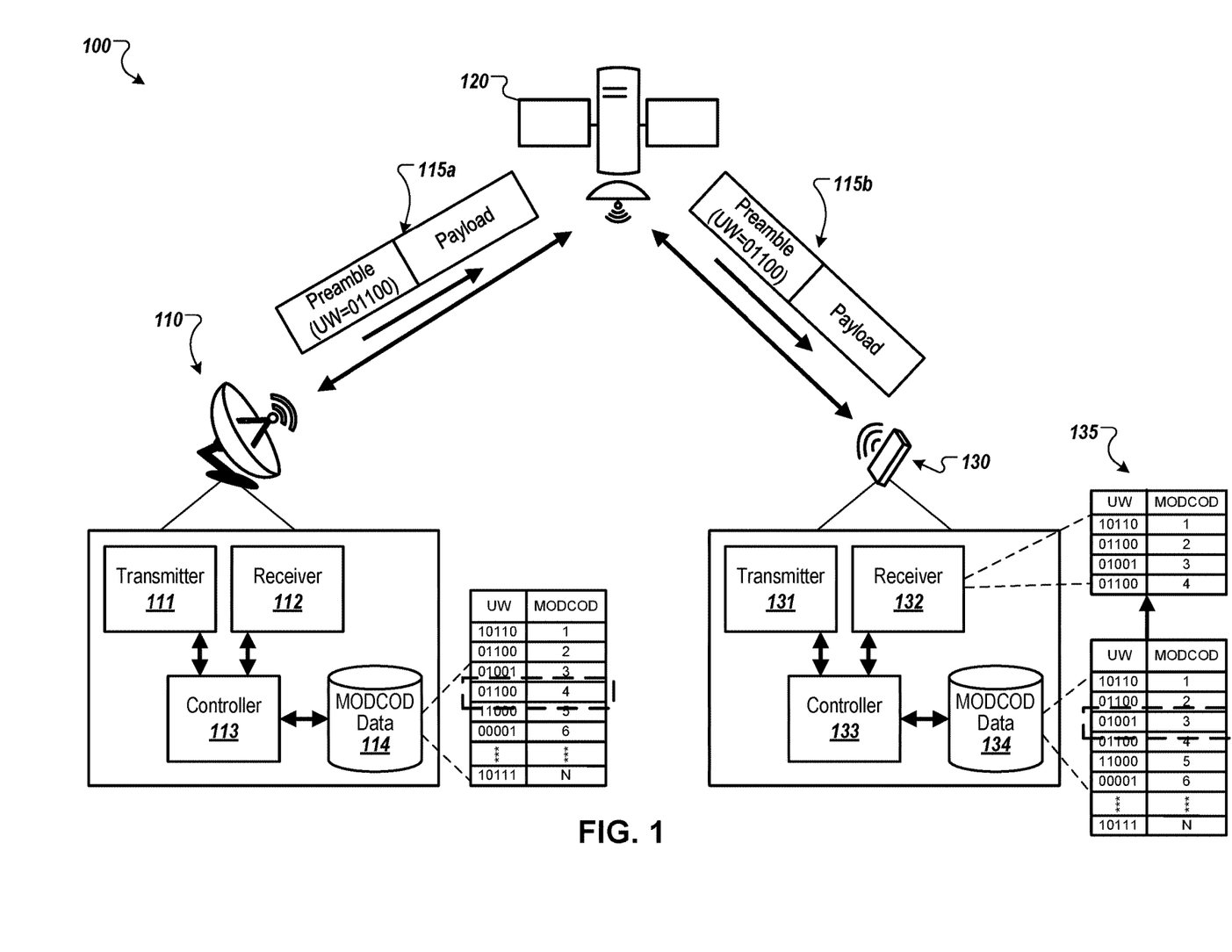
FIG. 1 is a diagram showing an example of a system for determining a communication parameter scheme for a data transmission and obtaining data from the data transmission based on the communication parameter scheme.

FIG. 1 is a diagram showing an example of a system 100 for determining a communication parameter scheme for a data transmission and obtaining data from the data transmission based on the communication parameter scheme. The system 100 includes a satellite gateway 110, a satellite 120, and a satellite terminal 130. The satellite 120, the gateway 110, and the terminal 130 can be part of a satellite communication network that includes one or more satellites, one or more gateways, and multiple terminals. Although the techniques described herein are described in terms of a satellite communication system, the techniques can be used on other wireless data communication systems.

The gateway 110 includes a transmitter 111, a receiver 112, a controller 113, and modulation and coding (MOD-COD) data 114. Similarly, the terminal 130 includes a transmitter 131, a receiver 132, a controller 133, and MOD-COD data 134. The transmitters 111 and 131 can generate satellite transmissions on a satellite link according to any of multiple different communication parameter schemes, such as different MODCODs. Each communication parameter scheme can include a corresponding modulation, coding, spreading factor, symbol rate, roll-off factor, and/or chip rate. For example, each communication parameter scheme can include a corresponding modulation and coding. In another example, each communication parameter scheme can include a corresponding modulation, coding, and symbol rate. In yet another example, each communication parameter scheme can include a corresponding modulation, coding, spreading factor, and symbol rate. In yet another example, each communication parameter scheme can include a corresponding modulation, coding, spreading, symbol rate, and roll-off factor. In yet another example, each communication parameter scheme can include a corresponding modulation, coding, spreading, symbol rate, roll-off factor, and chip rate.

The coding can be a forward error correction (FEC) for the link, which is used to combat noise and other interference of a wireless link. The spreading factor can represent a spread-spectrum parameter. For example, the spreading can represent how a signal that is generated with a given bandwidth is spread in spread within the frequency domain. The roll-off factor can represent a steepness on the sides of the band of spectrum. The chip rate can represent a number of pulses per second at which the code is transmitted. When a spreading factor is used, the symbol rate can be changed as the result of either a chip rate change or a spreading factor change.

In various examples below, different communication parameter schemes are referred to simply as MODCODs. Nevertheless, in each case where a MODCOD is referenced, a communication parameter scheme of more, fewer, or different communication parameters than modulation and coding can be used, for example, a combination of modulation, coding, and symbol rate; a combination of coding and symbol rate; a combination of modulation, coding, symbol rate, and spreading factor; a combination of modulation, coding, symbol rate, spreading factor, and roll-off factor; a combination of modulation, coding, symbol rate, spreading factor, roll-off factor, and chip rate, and so on. In this description, each instance of MODCOD (e.g., combination of a modulation and a coding) can optionally be a MOD-CODSYM (e.g., combination of a modulation, a coding, and a symbol rate) or another combination of parameters.

Each communication parameter scheme provides a tradeoff between robustness and data throughput. Robustness is a measure of the ability of data transmissions transmitted according to the communication parameter scheme to tolerate noise, e.g., the maximum signal-to-noise (SNR) the transmissions can tolerate with an acceptable error rate. The data throughput can be measured in terms of bits-per-second (bps), e.g., in mega bits-per-second (Mbps). By enabling changes in symbol rates in combination with modulation and coding, the gateway 110 and terminal 130 can adapt to available bandwidth in addition to different levels of interference.

Typically, a demodulation process can require a specific number of samples per symbol. As a front-end analog-to-digital converter typically samples at a constant rate, changing the symbol rate would changes the number of samples per symbol, which can affect the detection of the transmission and particularly the MODCOD field. Rather than needing to search for all combinations of the modulation and code rates as well as the symbol rates, the techniques described in this document limits the receiver to only searching for a few (e.g., two or three) combinations of all possible modulations, code rates, and symbol rates. This allows the controllers 113 and 133 to change the symbol rate, e.g., in addition to the modulation and coding.

As described in more detail below, each controller 113 and 133 can change the communication parameter scheme for its transmitter 111 and 131, respectively, based on the conditions of the link over which the transmitter 111 and 131 is transmitting data. For example, the controller 113 can change the communication parameter scheme of the transmitter 131 based on the SNR of the link, e.g., as measured by the receiver 112 that receives the transmissions from the transmitter 131. This allows the transmitters 113 and 133 to use higher data throughout communication parameter schemes when possible, but drop to more robust communication parameter schemes when link conditions are deteriorated.

The MODCOD data 114 can be stored in a data storage device of the gateway 110 and can include data specifying each communication parameter scheme with which the gateway 110 and terminal 130 are configured to communicate (e.g., an indication of the schemes that the gateway 110 can transmit and an indication of the schemes that the terminal 130 can appropriately receive and process). Similarly, the MODCOD data 134 can be stored in a data storage device of the terminal 130 and can include each communication parameter scheme according to which the gateway 110 and terminal 130 are configured to communicate (e.g., an indication of the schemes that the terminal 130 can transmit and an indication of the schemes that the gateway 110 can appropriately receive and process). The MODCOD data 114, 134 may take various forms In some implementations, the transmitter 111 and receiver 132 can use different communication parameter schemes than the transmitter 132 and receiver 112. For example, at any given time, the uplink from the terminal 130 can use a different communication parameter scheme than the downlink to the terminal 130. Similarly, the uplink can use different possible communication parameter schemes than the downlink. In such a case, each transmitter-receiver pair can use different MODCOD data stored at the gateway 110 and the terminal 130.

The communication parameter schemes can be ordered, e.g., ranked, based on respective SNR thresholds. The SNR threshold for a communication parameter scheme can be equal to the maximum tolerable SNR for the communication parameter scheme. For example, a lowest ranked communication parameter scheme can have the lowest SNR threshold and be the most robust communication parameter scheme but have the lowest data throughout. The lowest ranked communication scheme can also require the least amount of power to transmit, e.g., from the satellite 120. The lowest ranked communication parameter scheme can also have the lowest symbol rate of the communication parameter schemes. Thus, the communication parameter scheme having the lowest SNR threshold and the lowest symbol rate among the communication parameter schemes can be selected at the most robust and therefore the lowest ranked communication parameter scheme.

In this example, the highest ranking communication parameter scheme can be the least robust communication scheme having the highest SNR threshold and the highest throughput. The other communication parameter schemes can be ordered with increasing SNR thresholds in the ranking from the lowest ranked communication parameter scheme to the highest communication parameter scheme based on their respective SNR thresholds. The MODCOD data 114 and 134 can include data specifying the same ordering of communication parameter schemes. In the illustrated example, the gateway 110 and terminal 130 communicate using N communication parameter schemes MODCOD 1-MODCOD N.

The MODCOD data 114 and 134 also includes a unique identifier for each communication parameter scheme. The unique identifier for a communication parameter scheme can include a pattern of symbols that is unique to the communication parameter scheme. In this example, the identifier for each communication parameter scheme is a unique word (UW) having a sequence of at least five symbols. The UW is a sequence of symbols that is included in the preamble (or other portion) of a data transmission and that can be used for detection of a burst or a frame. For example, the data transmission 115a includes a preamble that has a UW for the data transmission 115a and a payload. Each communication parameter scheme can be assigned a UW that is included in the preamble of data transmissions that are sent according to the communication parameter scheme.

When a receiver, e.g., the receiver 112 or 132, receives a data transmission, the receiver can correlate the UW (or other identifier) included in the data transmission with the UWs of the communication parameter schemes to determine which communication parameter scheme was used for the data transmission. As there can be many different communication parameter schemes and each UW can include a large number of symbols, e.g., 26 symbols or more, comparing the UW of a data transmission to the UW for each communication parameter scheme can require a significant amount of time and require significant hardware resources of the receiver.

For ease of description, example techniques for transmitting and receiving data in the system 100 will be described in terms of sending data from the gateway 110 to the terminal 130. However, the same or similar techniques can be used when sending data from the terminal 130 to the gateway 110.

The controller 113 can change the communication parameter scheme of the transmitter 111 based on the SNR of the link and the SNR thresholds of the communication parameter schemes. In general, to maximize data throughput, the controller 113 will attempt to use the highest ranked communication parameter scheme that has an SNR threshold that exceeds the SNR of the link. To minimize the time and resources required of the receiver 132 to determine which communication parameter scheme was used to send a data transmission, the controller 113 (or transmitter 111) can select a communication parameter scheme for a data transmission from a limited subset of the communication parameter schemes that the receiver 132 is configured to receive. By limiting the subset of communication parameter schemes, the terminal 130 can operate without a hardware correlator to detect the communication parameter scheme used for a transmission. In many cases, as discussed further below, software of the terminal 130 determines the subset of communication parameter schemes, and the set may be as small as 4, 3, or 2 of the many communication parameter schemes the receiver 132 supports.

In some implementations, the subset of communication parameter schemes is based on the communication parameter scheme for a previous data transmission, e.g., that last data transmission from the transmitter 111 to the receiver 132. For example, the controller 113 can be limited to moving up or down a limited number of communication parameter schemes in the ranking of communication parameter schemes. In a particular example, the controller 113 can be limited to moving up or down only one communication parameter scheme in the ranking. In this example, the subset of communication parameter schemes would include the previous communication parameter scheme used by the transmitter 111, the communication parameter scheme that is one spot lower in the ranking than the previous communication parameter scheme, and the communication parameter scheme that is one spot higher in the ranking than the previous communication parameter scheme.

To select a communication parameter scheme for a data transmission, the controller 113 can compare the SNR of the link (e.g., as measured by the receiver 132 and communicated to the gateway 110) to the SNR threshold for each communication parameter scheme in the subset of communication parameter schemes. The controller 113 can select the highest ranking communication parameter scheme in the subset for which the SNR of the link exceeds the SNR threshold of the communication parameter scheme.

The receiver 132 can be configured to compare the UW (or other identifier) of a data transmission to only the UWs of the communication parameter schemes in the subset of communication parameter schemes. For example, the receiver 132 (or the controller 133) can be configured to determine the subset of communication parameter schemes based on the communication parameter scheme of the last data transmission received by the receiver 132 from the transmitter 131. Continuing the previous example, the receiver 132 (or the controller 133) can identify, as the subset of communication parameter schemes, the previous communication parameter scheme, the communication parameter scheme that is one position lower in the ranking than the previous communication parameter scheme, and the communication parameter scheme that is one spot higher in the ranking than the previous communication parameter scheme. If the controller 133 makes the determination, the controller 133 can configure the receiver 132 to only consider the subset of communication parameter schemes for subsequent data transmissions from the transmitter 111. The receiver can compare the UW of the data transmission to only the UW for each of these three communication parameter schemes to determine the communication parameter scheme according to which the data transmission was sent by the transmitter 111.

In this example, the transmitter 111 is limited to moving up or down one position in the ranking when selecting a communication parameter scheme for a data transmission. In this case, the receiver 132 is configured to only consider the three possible communication parameter schemes that the transmitter 111 will use based on the most recent communication parameter scheme (e.g., the most recently used scheme, a scheme with one step higher throughput, and a scheme one increment lower throughput). This enables the controller 113 to dynamically and incrementally adapt to changing link conditions, while also reducing the burden and complexity of the receiver 132 in detecting the changes in communication parameter schemes.

In some implementations, the subset of communication parameters also includes a default communication parameter scheme. The default communication scheme can be the most robust communication scheme that can best tolerate the worst link conditions. In this way, the controller 113 can adapt quickly to severe interference without having to step down through a large number of communication parameter schemes in multiple steps. At any time and regardless of the prior communication parameter scheme used, the controller 113 direct transmissions to be made with the default communication parameter scheme to preserve the connection, and the receiver 132 will be ready to receive the transmissions. Thus, this allows quicker recovery to resynchronize the receiver the transmitter coding and to provide an emergency detection during adversarial contact (e.g., intentional jamming in a contested environment). The receiver 132 can be configured to always compare the UW of a data transmission to the UW for the default communication parameter scheme, in addition to the other communication parameter schemes in the subset. The default communication parameter scheme can be used for initialization between the transmitter 111 and the receiver 131, for error recovery, and/or for exception handling in high interference environments.

In general, the techniques used by the controller 113 to select which new MODCOD to use and the techniques used by the controller 133 to select the subset of MODCODs to monitor are coordinated and deterministic, so that there is no need to exchange communications in order to arrange for an upcoming change in MODCOD used by the transmitter 111. For example, the controller 113 can operate with a set of MODCOD change rules that specify, for example, that a transmission can only be made using a certain subset of MODCODs, e.g., the current MODCOD, a MODCOD with a specific relative position higher in the ranking, a MODCOD with a specific relative position lower in the ranking, or the default MODCOD. The controller 133 can be configured to select the subset of MODCODs that it monitors using the same rules. As a result, the controller 113 will be guaranteed to choose a MODCOD for transmission that is in the subset of MODCODs that the controller 133 selects to be potentially received.

In some implementations, the gateway 110 and the terminal 130 can communicate to coordinate changes in the communication parameter scheme used for a communication link. This can allow the number of communication parameter schemes that the receiver 132 evaluates to be further reduced while also allowing changes to any supported communication parameter scheme, regardless of the position in the ranking relative to the current communication parameter scheme. For example, the subset can be limited to only the two communication parameter schemes, e.g., the default communication parameter scheme and a communication parameter scheme that is selected by the controller 113 or the controller 133. As another example the subset can be limited to the current or most recently used communication parameter scheme, and a communication parameter scheme selected by the controller 113 or the controller 133. As another example the subset can be limited to three communication parameter schemes, e.g., the default communication parameter scheme, the current or most recently used communication parameter scheme, and a communication parameter scheme selected by the controller 113 or the controller 133. To change the communication parameter scheme used, the controller 133 may send a request for a particular communication parameter scheme to be used, and the controller 113 may make the change in response, potentially acknowledging and confirming the new communication parameter scheme to be used first. In other cases, the controller 133 may initiate the change in communication parameter scheme and notify the controller 113 of the new communication parameter scheme to be used.

For example, the transmitter 111 can send data transmissions to the receiver 132 using a first communication parameter scheme. The controller 133 can monitor the SNR of the link to determine if the communication parameter scheme should be changed. If the controller 133 determines to change the communication parameter scheme, the controller 133 can select any communication parameter scheme from the multiple communication parameter schemes in the MODCOD data 114. For example, the controller 133 can select, as a second communication parameter scheme, the highest ranking communication parameter scheme for which the SNR of the link exceeds the SNR threshold of the communication parameter scheme. This second communication parameter scheme can be more than one spot higher or lower in the ranking than the first communication parameter scheme currently being used by the transmitter 111. That is, the second communication parameter scheme need not be a fixed or predetermined number of communication parameter schemes from the first communication parameter scheme in the ranking of communication parameter schemes.

The controller 133 can then cause the transmitter 131 to send a notification to the receiver 112 that instructs the controller 113 to switch to the second communication parameter scheme. The controller 133 can also instruct the receiver 132 to begin comparing the UW for data transmissions received from the transmitter 111 to the UW for the second communication parameter scheme. The receiver 132 can compare the UW for subsequent data transmissions to the UWs for the first communication scheme that the transmitter 111 has been using and the selected communication parameter scheme, and optionally the UW for the default communication parameter scheme. Thus, in this example, the receiver 132 can limit its correlation of UWs to two or three communication parameter schemes.

In some implementations, the controller 113 (or the receiver 132) can delay for some time period before expecting data transmissions using the second communication parameter scheme. For example, there is a round trip delay between sending the notification and receiving a new data transmission that was transmitted according to the second communication parameter scheme. During this time, the receiver 132 does not need to compare the UW for data transmissions to the UW for the second communication parameter scheme as there would not have been enough time for the transmitter 111 to switch communication parameter schemes and for a data transmission that was transmitted according to the second communication parameter scheme to arrive at the receiver 132. After some additional time, the receiver 132 can stop comparing the UWs of the data transmissions to the UW for the first communication parameter scheme as the transmitter 111 will no longer be sending data transmissions according to the first communication parameter scheme.

As described in more detail below, the controller 113 can include software that determines whether to switch to a different communication parameter scheme and, if so, which communication parameter scheme to select for subsequent data transmissions. For example, the software can include modules that compare the SNR for the link to the SNR threshold for each communication parameter scheme and select the highest ranking communication scheme (or the communication scheme that has the highest data throughput) for which the SNR of the link exceeds the SNR threshold for the communication parameter scheme.

The software can also determine a time, e.g., an approximate time, at which the change will occur. The use of the software enables the controller 113 to determine a symbol rate of the communication parameter scheme and to notify the terminal 130 when a change in communication parameter schemes will occur.

In the example of FIG. 1, the transmitter 111 of the gateway 110 sends a data transmission 115a to the satellite 120 according to a communication parameter scheme, MODCOD 4. The data transmission 115a includes encoded data in the payload and a preamble having an UW of "01100," which corresponds to MODCOD 4, as shown in the MODCOD data 114. The satellite 120 sends a matching data transmission 115b to the receiver 131 of the terminal 130.

In this example, assume that the previous data transmission sent from the transmitter 111 to the receiver 132 was sent according to MODCOD 3, as shown by the dashed box in the MODCOD data 134. The communication parameter schemes are ranked with increasing SNR thresholds from MODCOD 1 to MODCOD N. In this example, the receiver 132 will be expecting a data transmission sent according to a communication parameter scheme that is in a subset of communication parameter schemes. This subset can be determined based on the previous communication parameter scheme, MODCOD 3. For example, as described above, the subset can include the previous communication parameter scheme (MODCOD 3), the communication parameter scheme (MODCOD 4) that is one spot above the previous communication parameter scheme in the ranking, the communication parameter scheme (MODCOD 2) that is one spot lower than the previous communication parameter scheme, and the default communication scheme (MODCOD 1).

When the receiver 132 receives the data transmission 115b, the receiver can correlate the UW in the preamble of the data transmission 115b with the UWs of the communication parameter schemes in the subset. That is, the receiver 132 can compare the UW in the preamble of the data transmission 115b to only the UWs for MODCODS 1-4 as shown in the table 135. In this example, the receiver 132 will find a match between the UW in the preamble and the UW for MODCOD 4 and decode the data in the payload based on MODCOD 4, as described below. After determining that the data transmission 135 was sent according to MODCOD 4, the receiver 132 can update the subset of communication parameter schemes to include MODCODs 1, 3, 4, and 5 rather than MODCODS 1-5 as MODCODs 3 and 5 are one step from the previous communication parameter scheme, MODCOD 4.

Figure 2:
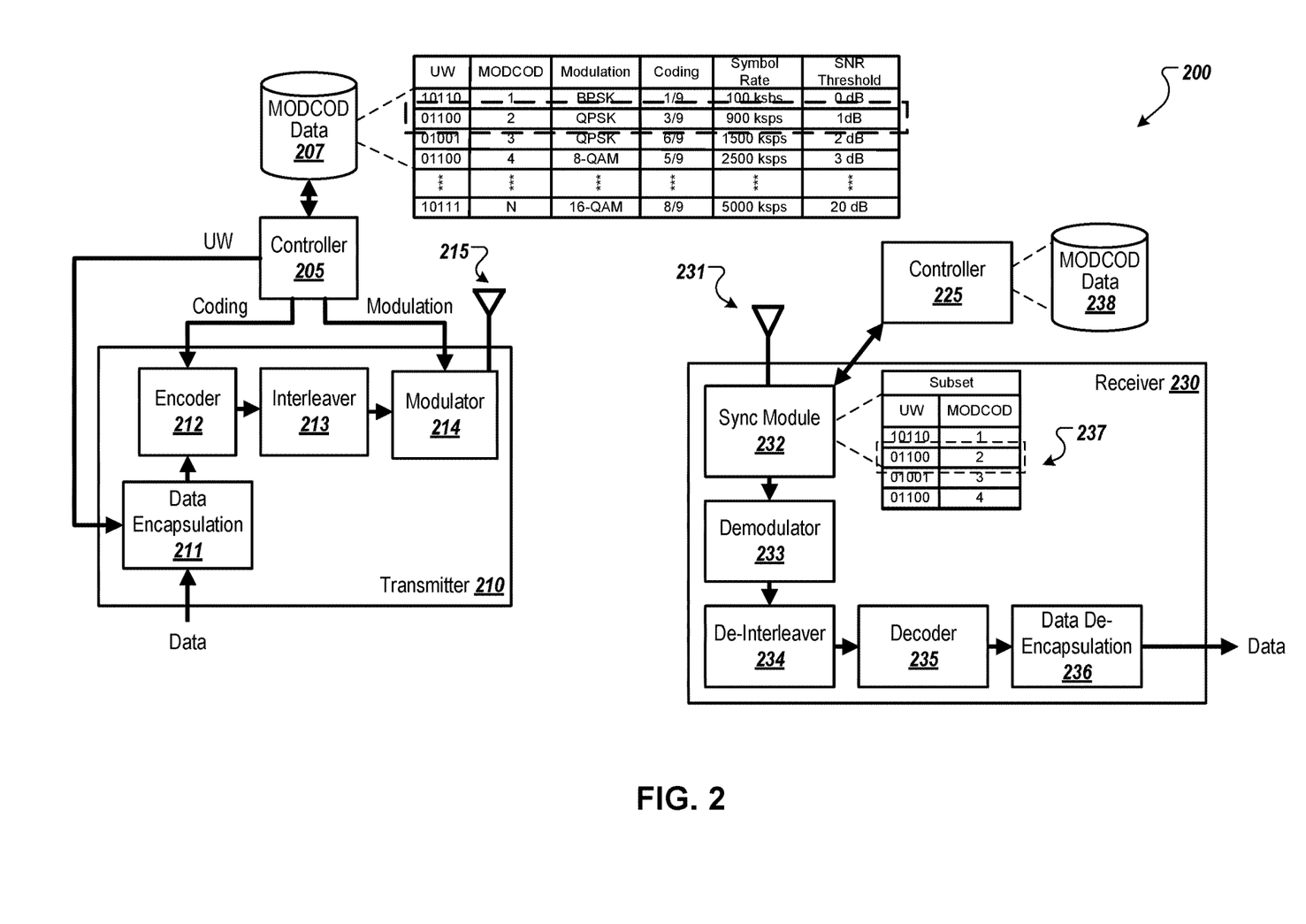
FIG. 2 is a diagram showing another example of a system for determining a communication parameter scheme for a data transmission and obtaining data from the data transmission based on the communication parameter scheme.

FIG. 2 is a diagram showing another example of a system 200 for determining a communication parameter scheme for a data transmission and obtaining data from the data transmission based on the communication parameter scheme. The system 200 includes a transmitter 210 and a receiver 230. The transmitter 210 can be part of a satellite gateway and the receiver 230 can part of a satellite terminal. In another example, the transmitter 210 can be part of a satellite terminal and the receiver 230 can be part of a satellite gateway. In either example, the transmitter 210 can be configured to send data transmissions to the receiver 230 using multiple different communication parameter schemes.

The transmitter 210 includes a data encapsulation module 211, an encoder 212, an interleaver 213, a modulator 214, and a transmit antenna 215. The data encapsulation module 211 receives data for transmission to the receiver 230 and performs encapsulation to form the frames of the data transmission, e.g., the baseband packets of a satellite transmission. The encoder 212 encodes the frames according to a coding of a communication parameter scheme. The interleaver 213 reorders a sequence of symbols received from the encoder 212 in a predetermined manner. The modulator 214 maps the sequence of symbols to signal waveforms according to a modulation of the communication parameter scheme. The signal waveforms are then transmitted to the receiver 230 by the transmit antenna 215.

A controller 205, e.g., a controller of the gateway or terminal that includes the transmitter 210, can select the communication parameter scheme from multiple different communication parameter schemes stored in a MODCOD data storage device 207. For example, the controller 205 can select the communication parameter scheme based on the SNR of the link over which the transmitter 210 send data transmissions to the receiver 230 and optionally the previous communication parameter scheme, as described above. As shown in the MODCOD data 207, each communication parameter scheme can include a modulation, a coding, a symbol rate, a corresponding UW, and a corresponding SNR threshold. Although not shown, each communication parameter scheme can also include a spreading and/or a roll-off factor. For example, MODCOD 1 has a modulation of BPSK, a coding of 1/9 FEC rate, a symbol rate of 100 kilo-symbols-per-second (ksps), and a SNR threshold of 0 decibels (dB). The values in the MODCOD data 207 are not real values and are provided only for the purpose of illustrating an example.

In this example, the controller 205 has selected MODCOD 2 as the communication parameter scheme as designated by the dashed box in the MODCOD data 207. Assume for the purpose of this example, that the previous communication parameter scheme used by the transmitter 210 was MODCOD 3. For example, the controller 205 may have determined to drop down to MODCOD 2 based on the SNR of the link no longer meeting the SNR threshold for MODCOD 3.

The controller 205 can provide the UW for the selected communication parameter scheme to the data encapsulation module 211 to be encapsulated in the preamble of the data transmission. The controller 205 can configure the encoder 212 to encode the frames according to the coding of the selected communication parameter scheme. Similarly, the controller 205 can configure the modulator 214 to modulate the signal waveforms according to the modulation of the selected communication parameter scheme. The modulator 214 can transmit the modulated signal waveforms at the symbol rate defined by the selected communication parameter scheme The data encapsulation module 211, the encoder 212, the interleaver 213, and the modulator 214 can be part of a physical layer of the transmitter 210. In some implementations, as described above, a software layer can be used to select the communication parameter scheme for a data transmission. This software can be executed by the controller 205 and include software modules for determine whether to change the communication parameter scheme, e.g., based on the SNR of the link, and/or select the communication parameter scheme for the link. The controller 205 can then provide appropriate data to the data encapsulation module 211, the encoder 212, and the modulator 214, as described above.

The receiver 230 includes a receive antenna 231, a synchronization module 232, a demodulator 233, a de-interleaver 234, a decoder 235, and a data de-encapsulation module 236. The receive antenna 231 receives the signal waveform sent by the transmit antenna 215. The sync module 232 performs synchronization and detects the UW of the signal waveform, e.g., from the preamble encoded in the signal waveform. The sync module 232 can also determine the communication parameter according to which the signal waveform was sent based on the UW and a data structure 237 that includes a subset of communication parameter schemes.

As described above, the subset of communication parameter schemes can be based on the communication parameter scheme of a previous data transmission received from the transmitter 210 or based on a notification received from a controller, e.g., the controller 205 or the controller 225. In this example, the previous communication parameter scheme was MODCOD 3 and the subset includes the communication parameter scheme one spot below MODCOD 3 in the ranking, which is MODCOD 2. The subset also includes the communication parameter scheme one spot above MODCOD 3 in the ranking, which is MODCOD 4. The subset also includes a default most robust communication parameter scheme, MODCOD 1.

The controller 225, which can be a controller of a gateway or terminal that includes the receiver, can determine the subset from MODCOD data 238, which can be the same as the MODCOD data 207. The controller 225 can generate and provide the data structure 237 to the sync module 232.

The sync module 232 can correlate the UW of the signal waveform to the UWs in the data structure 237. In this example, the sync module 232 determines that the communication parameter scheme is MODCOD 2 as designated by the dashed box in the data structure 237. The sync module 232 provides data specifying the modulation to the demodulator 233. The demodulator 233 demodulates the received signal waveform based on the modulation of communication parameter scheme (MODCOD 2).

The de-interleaver 234 reorders the sequence of symbols based on the manner of interleaving at the transmitter 210. The decoder 235 decodes the de-interleaved sequence of symbols based on the coding of the communication parameter scheme (MODCOD 2). For example, the sync module 232 can provide data specifying the coding of MODCOD 2 to the decoder 235. The data de-encapsulation module 236 de-encapsulates the encapsulated data output by the decoder 235.

The controller 225 can also generate a new data structure 237 based on the communication parameter of the most recent data transmission. The controller 225 can then provide the data structure to the sync module 232 for the next data transmission.

Figure 3:
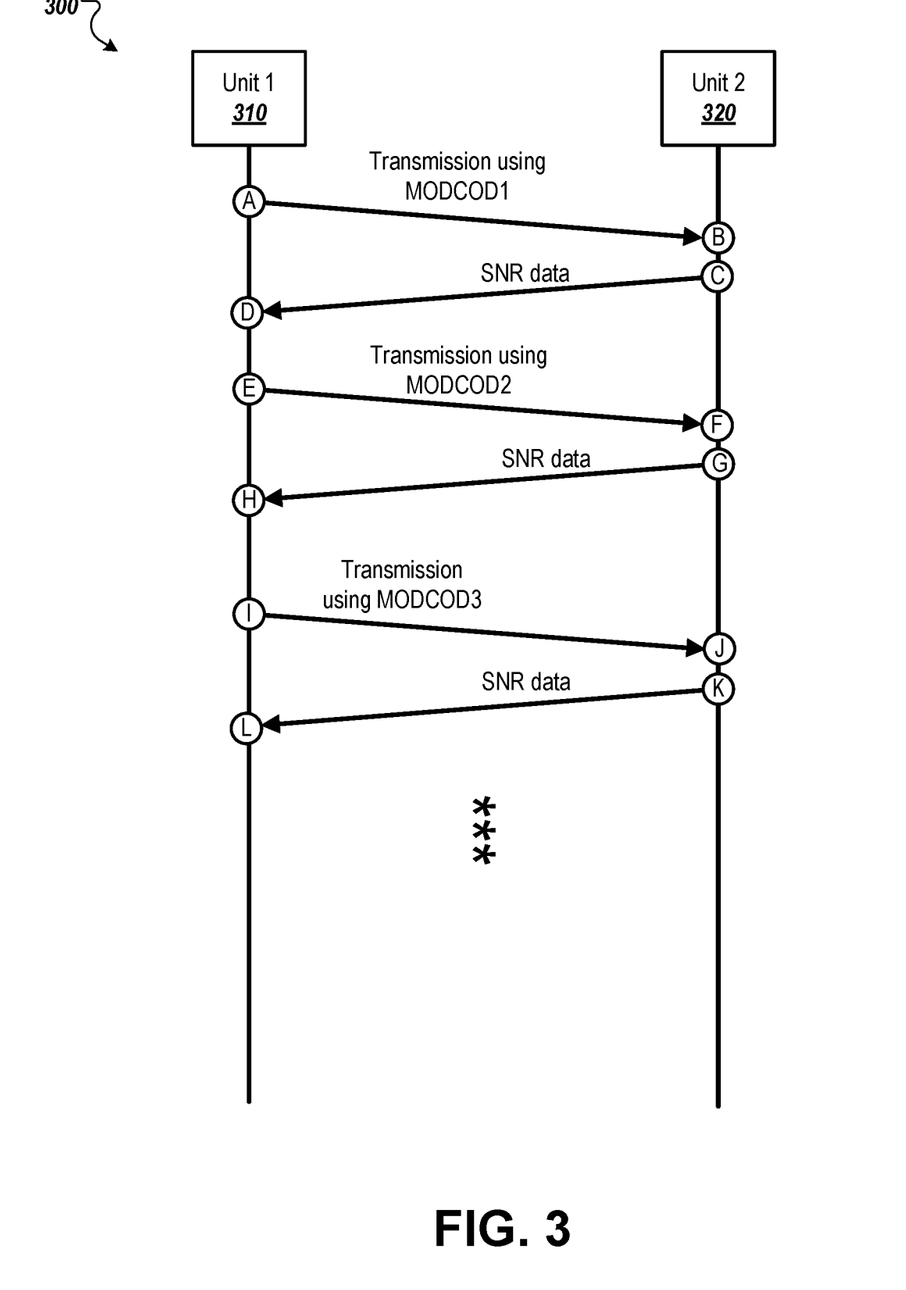
FIG. 3 is a diagram of an example process for changing communication parameter schemes.

FIG. 3 is a diagram 300 of an example process for changing communication parameter schemes. A first unit 310 sends data transmissions to a second unit 320. The first unit 310 can be a satellite gateway and the second unit 320 can be a satellite terminal. In another example, the first unit 310 can be a satellite terminal and the second unit 320 can be a satellite gateway.

In stage A, the first unit 310 sends a data transmission according to a communication parameter scheme, MODCOD 1. In stage B, the second unit 320 receives the data transmission and extracts data from the data transmission. For example as described above, the data transmission can include an identifier, e.g., a UW, that corresponds to MODCOD 1. The second unit 320 can obtain the identifier from the data transmission and compare the identifier to identifiers for a subset of communication parameter schemes to determine the communication parameter scheme for the data transmission. The second unit 320 can then demodulate and decode the data transmission according to MODCOD 1. In stage C, the second unit 320 measures the SNR of the data transmission and sends data specifying the SNR to the first unit 310.

In stage D, the first unit 310 receives the data specifying the SNR and determines whether the change communication parameter schemes based on the SNR. For example, a controller of the first unit 310 can compare the SNR to SNR thresholds for communication parameter schemes. In some implementations, the controller compares the SNR to SNRs of a subset of the communication parameter schemes. For example, as described above, a transmitter can be limited to changing the communication parameter scheme only one step up or one step down a ranking of communication parameter schemes. In this example, the controller can compare the SNR of the data transmission to the SNR thresholds for MODCOD 1 (the previous communication parameter scheme), a communication parameter scheme one spot below MODCOD 1, if any, and a communication parameter scheme one spot above MODCOD 1, if any. The controller can select, from the three communication parameter schemes, the highest ranking communication parameter scheme for which the SNR of the data transmission exceeds the SNR threshold.

In some cases, the SNR of the data transmission may not exceed the SNR threshold for any communication parameter scheme in the subset. In such a case, the controller can select the lowest ranked communication parameter scheme in the subset as the lowest communication parameter scheme is the most robust scheme. The controller can then step down over multiple cycles of sending data transmissions and changing schemes until it reaches a communication parameter scheme for which the SNR of the previous data transmission exceeds the SNR threshold of a communication parameter scheme.

In some implementations, the controller can also select a default communication parameter scheme, e.g., if the SNR of the data transmission does not exceed the SNR threshold for a communication parameter scheme in the subset of communication parameter schemes.

In this example, the controller selected MODCOD 2 based on the SNR of the previous data transmission, e.g., based on the SNR of the previous data transmission exceeding the SNR for MODCOD 2. In stage E, the first unit 310 sends a data transmission to the second unit 320 according to MODCOD 2. In stage F, the second unit 320 receives the data transmission and extracts data from the data transmission, similar to stage B. However, the second unit can 320 determine that MODCOD 2 was used for this data transmission based on the identifier in the data transmission and demodulate and decode the data transmission according to MODCOD 2. The second unit can also update the subset of communication parameter schemes based on MODCOD 2, e.g., to include MODCOD 2, the communication parameter scheme ranked one spot above MODCOD 2, and the communication parameter scheme ranked one spot below MODCOD 2. The subset can also include a default communication parameter scheme.

In stage G, the second unit 320 measures the SNR of the data transmission and sends data specifying the SNR to the first unit 310. In stage H, the first unit 310 receives the data specifying the SNR and determines whether the change communication parameter schemes based on the SNR, similar to stage D. However, the subset of communication parameters in stage H is based on MODCOD 2 instead of MODCOD 1. For example, the controller can compare the SNR of the data transmission to the SNR thresholds for MODCOD 2 (the previous communication parameter scheme), a communication parameter scheme one spot below MODCOD 2, if any, and a communication parameter scheme one spot above MODCOD 2, if any. The controller can select, from the three communication parameter schemes, the highest ranking communication parameter scheme for which the SNR of the data transmission exceeds the SNR threshold.

This process can continue for many cycles to adapt the communication parameter scheme to current link conditions. For example, stages I-L can be similar to stages E-H, but using MODCOD 3 rather than MODCOD 2.

Figure 4:
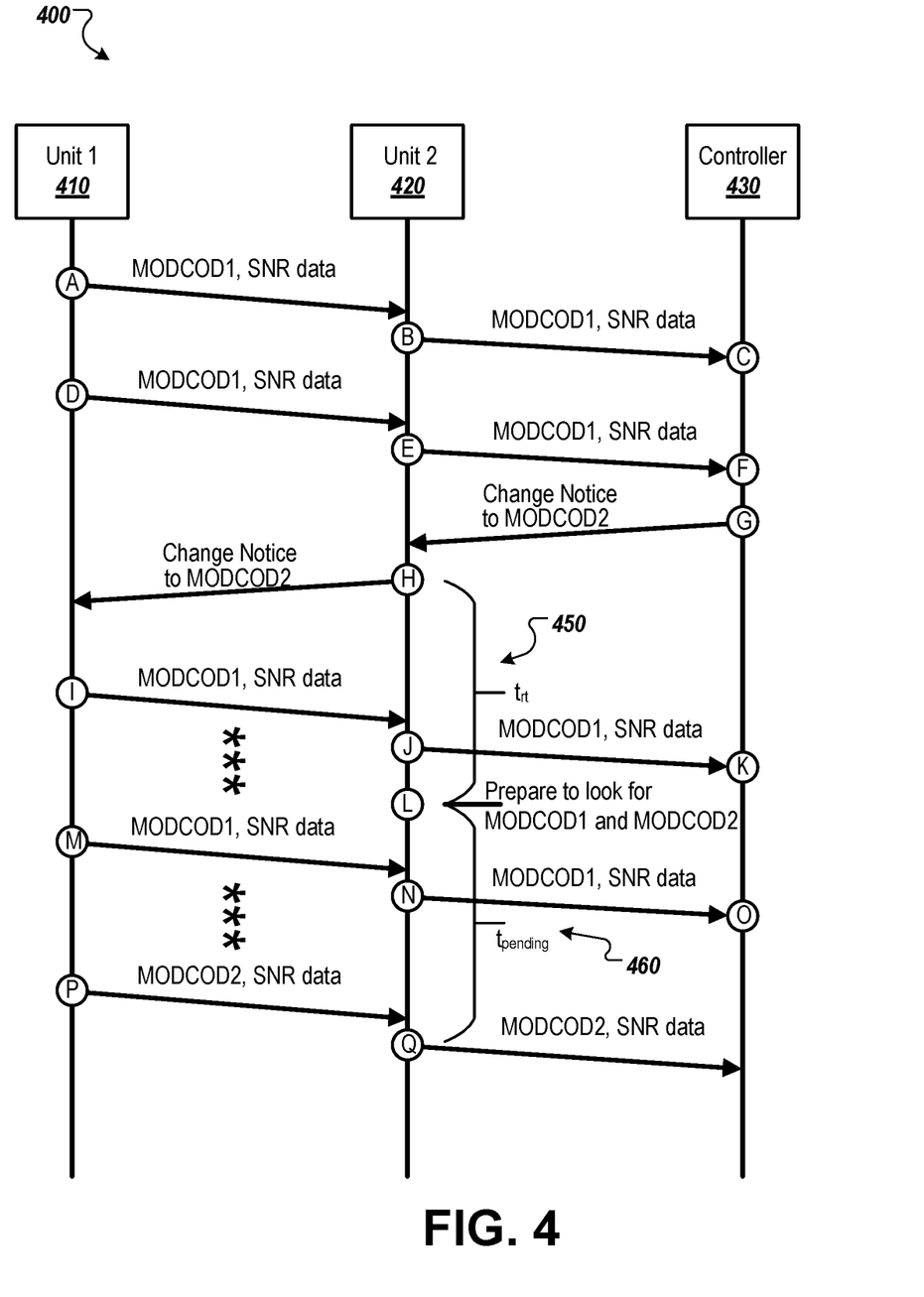
FIG. 4 is a diagram of another example process for changing communication parameter schemes.

FIG. 4 is a diagram 400 of another example process for changing communication parameter schemes. A first unit 410 sends data transmissions to a second unit 420. The first unit 410 can be a satellite gateway and the second unit 420 can be a satellite terminal. In another example, the first unit 410 can be a satellite terminal and the second unit 420 can be a satellite gateway.

In stage A, the first unit 410 sends a data transmission according to a communication parameter scheme, MODCOD 1. In stage B, the second unit 420 receives the data transmission and measures a SNR of the data transmission. The second unit 420 also demodulates and decodes the data communication based on the communication parameter scheme. In this stage, the second unit 420 may not need to determine the communication parameter scheme for the data transmission. Instead, the second unit 420 can be configured to expect data transmissions according to MODCON 1. If the communication parameter scheme is going to be changed, a controller 430 can notify the first and second units 410 and 420 before the change occurs. The second unit 420 can also provide the data transmission (or data identifying the communication parameter scheme for the transmission) and the SNR to the controller 430.

In stage C, the controller 430 can determine whether to change the communication parameter scheme based on the SNR. For example, the controller 430 can compare the SNR to SNR thresholds for multiple different communication parameters. The controller 430 can then select the highest ranking communication parameter scheme (e.g., the one having the highest data throughput) for which the SNR of the data transmission exceeds the SNR of the communication parameter scheme. This data communication parameter scheme can be any of the schemes and does not have to be within one step of MODCOD 1. At this stage, the controller 430 does not change the communication parameter scheme in response to determining that there is no need for a change.

In stage D, the first unit 410 sends another data transmission according to MODCOD 1. In stage E, the second unit 420 receives the data transmission and measures a SNR of the data transmission. The second unit 420 also demodulates and decodes the data communication based on the communication parameter scheme. The second unit 420 also provides the data transmission (or data identifying the communication parameter scheme for the transmission) and the SNR to the controller 430.

In stage F, the controller 430 determines whether to change the communication parameter scheme, similar to stage C. At this stage, the controller 430 changes the communication parameter scheme to MODCOD 2, e.g., in response to the SNR of the data transmission exceeding the SNR threshold for MODCOD 2 and MODCOD 2 having a higher data throughput or being higher ranked than MODCOD 1.

In stage G, the controller 430 sends a notification to the second unit 420 of the change to MODCOD 2. The notification can include data specifying MODCOD 2 and optionally a delay time period 450. The delay time period 450 can be based on a round trip time required to send data from the second unit 420 to the first unit 410 and back to the second unit 420, e.g., the round trip propagation delay between the first and second units 410 and 420. The delay time period can begin when the second unit sends the notification to the first unit in stage H. At the expiration of the delay time period, the second unit 420 can expect to receive data transmissions according to MODCOD 2. However, during the delay time period, the second unit 420 can expect only data transmissions according to MODCOD 1.

In stage I, the first unit 410 sends another data transmission according to MODCOD 1. In stage J, the second unit 420 receives the data transmission. As the delay time period 450 has not expired, the second unit 420 demodulates and decodes the data transmission according to MODCOD 1. The second unit 420 also measures the SNR of the data transmission and sends the data transmission (or data identifying the communication parameter scheme for the transmission) and the SNR to the controller 430. In stage K, the controller 430 determines whether to change the communication parameter scheme, similar to stage C. At this stage, the controller 430 does not change the communication parameter scheme. Instead, the controller 430 determines to keep MODCOD 2 as the communication parameter scheme.

In stage L, the delay time period expires. At this point, the second unit 420 an start receiving data transmissions sent according to MODCOD 2. However, the second unit 420 can also receive data transmissions according to MODCOD 1, e.g., due to the time required to switch to MODCOD 2. Thus, during a pending time period 460, the second unit 420 can obtain the identifier from each data transmission received from the first unit 410 and compare the identifier to the identifier for MODCOD 1 and the identifier for MODCOD 2 to determine which communication parameter scheme was used to send the data transmission. The second unit 420 can then demodulate and decode the data transmission according to the communication parameter scheme having the identifier that matches the identifier of the data transmission.

In stage M, the first unit sends another data transmission according to MODCOD 1. In stage N, The second unit 420 receives the data transmission, obtains the identifier from the data transmission, and compares the identifier to the identifiers for MODCOD 1 and MODCOD 2. In this example, the second unit 420 determines that the identifier matches the identifier for MODCOD 1 and demodulates and decodes the data transmission according to MODCOD 1. The second unit 420 also measures the SNR of the data transmission and sends the data transmission (or data identifying the communication parameter scheme for the transmission) and the SNR to the controller 430. In stage K, the controller 430 determines whether to change the communication parameter scheme, similar to stage C. At this stage, the controller 430 does not change the communication parameter scheme.

In stage P, the first unit 410 sends a data transmission according to MODCOD 2. In stage Q, the second unit 420 receives the data transmission, obtains the identifier from the data transmission, and compares the identifier to the identifiers for MODCOD 1 and MODCOD 2. In this example, the second unit 420 determines that the identifier matches the identifier for MODCOD 2 and demodulates and decodes the data transmission according to MODCOD 2. The second unit 420 also measures the SNR of the data transmission and sends the data transmission (or data identifying the communication parameter scheme for the transmission) and the SNR to the controller 430.

At the end of the pending time period 460, or after receiving a data transmission according to MODCOD 2, the second unit 420 can expect further data transmissions from the first unit 1 to be transmitted according to MODCOD 2 until the controller 430 sends another notification. Thus, the second unit 420 can stop comparing the identifier of the data transmissions to the identifiers of communication parameter schemes after the pending time period 460 ends or after receiving a data transmission according to MODCOD 2. If the controller 430 determines to change the communication parameter scheme, stages G-Q can be repeated based on the new scheme.

Figure 5:
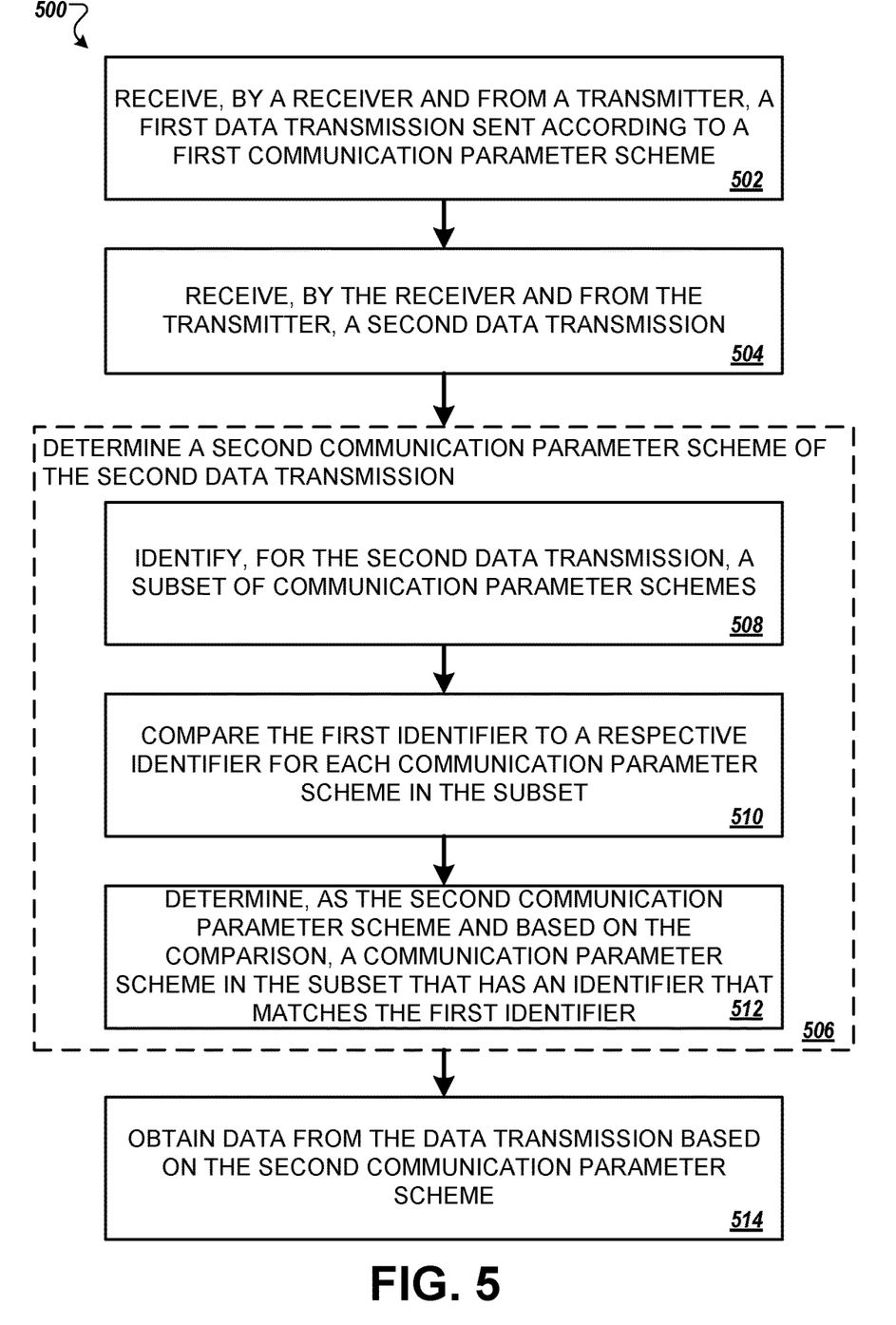
FIG. 5 is a flow diagram illustrating an example of a process for determining a communication parameter scheme for a data transmission and obtaining data from the data transmission based on the communication parameter scheme.

FIG. 5 is a flow diagram illustrating an example of a process 500 for determining a communication parameter scheme for a data transmission and obtaining data from the data transmission based on the communication parameter scheme. The process can be performed by a wireless receiver, such as the satellite receivers 112 or 132 of FIG. 1 or the receiver 230 of FIG. 2. The receiver can include a controller having one or more hardware processors. For example, the receiver can be part of a transceiver that includes the controller.

The receiver receives, from a transmitter, a first data transmission sent according to a first communication parameter scheme (502). The first communication parameter scheme can include a first modulation, a first coding (e.g., a first FEC rate), a first symbol rate, a first spreading factor, a first roll-off factor, and/or a first chip rate. The first data transmission can include an identifier for the first communication parameter scheme and a payload. For example, the identifier can be part of a preamble of the data transmission.

For an initial data transmission from the transmitter to the receiver, the first communication scheme can be the most robust communication parameter scheme of multiple different communication parameter schemes according to which the transmitter and receiver are configured to communicate. As described above, the transmitter and receiver can be configured to communicate using multiple different communication parameter schemes, including the first communication parameter scheme. Each communication parameter scheme can be associated with a corresponding identifier, such as a unique word.

The receiver receives, from the transmitter, a second data transmission (504). The second data transmission can be sent according to a second communication parameter scheme, which may the same as, or different from, the first communication parameter scheme. As described above, the transmitter (e.g., a controller of the transmitter) can adjust the communication parameter scheme based on conditions of a link on which the transmitter is transmitting data to the receiver. For example, the transmitter can adjust the communication parameter scheme based on the SNR of the link.

The receiver determines the second communication parameter scheme of the second data transmission (506). The receiver can determine the second communication parameter scheme using constituent operations 508-512.

The receiver identifies, for the second data transmission, a subset of the multiple different communication parameter schemes. Each communication parameter scheme of the multiple different communication parameter schemes is a candidate communication parameter scheme that may be used for the second data transmission. In some implementations, the subset is based on the communication parameter scheme used for the previous data transmission from the transmitter to the receiver, e.g., the first communication parameter scheme of the first data transmission. For example, as described above, the subset can be limited to the previous communication parameter scheme of the previous data transmission, the communication parameter scheme one step above the previous communication parameter scheme in a ranking of the multiple different communication parameter schemes, and the communication parameter scheme that is one step below the previous communication parameter scheme in the ranking. In some implementations, the subset also includes a default communication parameter scheme, e.g., the most robust communication parameter scheme of the multiple different communication parameter schemes.

In some implementations, the subset is limited to the previous communication parameter scheme and one or two other communication parameter schemes. For example, the subset can include the previous communication scheme and another communication parameter scheme selected by a controller as a next communication scheme for the transmitter to begin using. For example, as described above with reference to FIG. 4, the controller can notify the receiver and the transmitter of the next communication parameter scheme. After a delay time period, the receiver can begin comparing the identifier of data transmissions to the identifier for the next communication parameter scheme. This subset can also include the default communication parameter scheme.

The receiver compares the first identifier to a respective identifier for each communication parameter scheme in the subset (510). The receiver determines, as the second communication parameter scheme and based on the comparison, a communication parameter scheme in the subset that matches the first identifier (512).

The receiver obtains data from the data transmission based on the second communication parameter scheme (514). For example, the receiver can demodulate and decode the data transmission according to the modulation and coding of the second communication parameter scheme.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims can be performed in a different order and still achieve desirable results.

What is claimed is:

1. A method for data transmission in a communication system, the method comprising:
receiving, by a receiver, a first data transmission sent by a transmitter over a wireless link according to a first communication parameter scheme that includes at least one of a first modulation or a first coding;

after receiving the first data transmission, receiving, by the receiver and from the transmitter, a second data transmission;

in response to receiving the second data transmission, determining, by the receiver, a second communication parameter scheme according to which the second data transmission was sent, including:

identifying, by the receiver and from a set of multiple candidate communication parameter schemes, a subset of the candidate communication parameter schemes that is determined based on the first communication parameter scheme, wherein the subset of the candidate communication parameter schemes includes at least two candidate communication parameter schemes but less than all of the candidate communication parameter schemes in the set of multiple candidate communication parameter schemes;

identifying, by the receiver and in the second data transmission, a first identifier that identifies the second communication parameter scheme;

comparing, by the receiver, the first identifier with respective identifiers for the candidate communication parameter schemes in the subset of the candidate communication parameter schemes; and selecting, by the receiver and from among the candidate communication parameters schemes in the subset of the candidate communication schemes, the second communication parameter based on the second communication parameter scheme having an identifier that matches the first identifier; and obtaining, by the receiver, data from the second data transmission based on the second communication parameter scheme.

2. The method of claim 1, wherein the first data transmission and the second data transmission are satellite transmissions.

3. The method of claim 1, wherein each communication parameter scheme includes a modulation and a coding corresponding to a forward error correction coding of the link.

4. The method of claim 3, wherein the first communication parameter scheme and the second communication parameter scheme have different modulations.

5. The method of claim 3, wherein the first communication parameter scheme and the second communication parameter scheme have different codings.

6. The method of claim 3, wherein each communication parameter scheme further includes a symbol rate.

7. The method of claim 6, wherein the first communication parameter scheme and the second communication parameter scheme have different symbol rates.

8. The method of claim 1, wherein the identifier is a unique word comprising a pattern of symbols.

9. The method of claim 1, wherein:

each communication parameter scheme in the multiple candidate communication parameter schemes corresponds to a signal-to-noise ratio threshold;

the multiple candidate communication parameter schemes are ranked according to the signal-to-noise ratio thresholds;

the subset of the candidate communication parameter schemes is limited to:

the first communication parameter scheme, a higher-ranked communication parameter scheme ranked higher than the first communication parameter scheme in the ranking, and a lower-ranked communication parameter scheme that is ranked lower than the first communication parameter scheme in the ranking; and the second communication parameter scheme is the higher-ranked communication parameter scheme or the lower-ranked communication parameter scheme.

10. The method of claim 9, wherein:

each communication parameter scheme in the multiple candidate communication parameter schemes corresponds to a signal-to-noise threshold;

the multiple candidate communication parameter schemes are ranked according to the signal-to-noise ratio thresholds;

the subset of the candidate communication parameter schemes is limited to:

the first communication parameter scheme, a higher-ranked communication parameter scheme that is ranked higher than the first communication parameter scheme in the ranking, a lower-ranked communication parameter scheme that is ranked lower than the first communication parameter scheme in the ranking, and a default communication parameter scheme; and the second communication parameter scheme is the higher-ranked communication parameter scheme, the lower-ranked communication parameter scheme, or the default communication parameter scheme.

11. The method of claim 10, wherein the default communication parameter scheme corresponds to (i) a lowest signal-to-noise ratio threshold of the multiple candidate communication parameter schemes and (ii) a lowest symbol rate of the multiple candidate communication parameter schemes.

12. The method of claim 1, further comprising:

determining, based on a signal-to-noise ratio for the first data transmission, to switch from the first communication parameter scheme to the second communication parameter scheme; and providing, to a transmitter, data instructing the transmitter to switch to the second communication parameter scheme, wherein the subset of the candidate communication parameter schemes includes only the first communication parameter scheme and the second communication parameter scheme.

13. The method of claim 12, wherein the subset of candidate communication schemes further includes a third communication parameter scheme that corresponds to a lowest signal-to-noise ratio of the multiple candidate communication parameter schemes.

14. The method of claim 12, wherein a software application determines the second communication parameter scheme based on the signal-to-noise ratio of the first data transmission and configures a receiver to compare the identifier to an identifier for the second communication parameter scheme.

15. The method of claim 1, wherein the subset of the candidate communication parameter schemes includes no more than four communication parameter schemes.

16. The method of claim 1, wherein the first communication parameter scheme is different from the second communication parameter scheme.

17. The method of claim 1, wherein a receiver that receives the first data transmission and the second data transmission is part of a communication terminal, wherein the second communication parameter scheme is not requested by the communication terminal, and the communication terminal is not notified of a switch to the second communication parameter scheme by a transmitter before the second data transmission is sent by the transmitter, wherein the transmitter transmits, to the receiver, the first data transmission and the second data transmission.

18. The method of claim 1, wherein each communication parameter scheme further includes at least one of a spreading factor, a roll-off factor, and/or a chip rate.

19. An apparatus for data transmission in a communication system, the apparatus comprising:
  a receiver configured to:
    receive data transmissions sent over a wireless link according to any of multiple communication parameter schemes; and
    obtain data from the data transmissions based on the communication parameter schemes; and
  a controller to select communication parameter schemes for the receiver to use to obtain data from received data transmissions, wherein the controller is configured to:
    identify, from a set of multiple candidate communication parameter schemes, a subset of candidate communication parameter schemes that is determined based on a previous communication parameter scheme of a previously received data transmission that was previously received by the receiver, wherein the subset of the candidate communication parameter schemes includes at least two candidate communication parameter schemes but less than all of the candidate communication parameter schemes in the set of multiple candidate communication parameter schemes;
    identify, in the data transmission, a first identifier that identifies a communication parameter scheme of a particular data transmission sent after the previously received data transmission;
    compare the first identifier with respective identifiers for the communication parameter schemes in the subset of the candidate communication parameter schemes; and
    select, from among the candidate communication parameters schemes in the subset of the candidate communication parameter schemes as the communication parameter scheme for receiving the particular data transmission based on the the communication parameter scheme having an identifier that matches the first identifier.

20. A non-transitory computer readable medium comprising instructions that, when executed by a data processing apparatus of a receiver, cause the data processing apparatus to perform operations comprising:
  receiving, by the receiver, a first data transmission sent by a transmitter over a wireless link according to a first communication parameter scheme that includes at least one of a first modulation or a first coding;
  receiving, by the receiver and from the transmitter, a second data transmission after receiving the first data transmission;
  in response to receiving the second data transmission, determining, by the receiver, a second communication parameter scheme according to which the second data transmission was sent, including:
    identifying, by the receiver and from a set of multiple candidate communication parameters schemes, a subset of the candidate communication parameter schemes that is determined based on the first communication parameter scheme, wherein the subset of the candidate communication parameter schemes includes at least two candidate communication parameter schemes but less than all of the candidate communication parameter schemes in the set of multiple candidate communication parameter schemes;
    identifying, by the receiver and in the second data transmission, a first identifier that identifies the second communication parameter scheme;
    comparing, by the receiver, the first identifier with respective identifiers for the candidate communication parameter schemes in the subset of the candidate communication parameter schemes; and
    determining, by the receiver and as the second communication parameter scheme and based on the comparison, a communication parameter scheme in the subset of the candidate communication parameter schemes that has an identifier that matches the first identifier; and
  obtaining, by the receiver, data from the second data transmission based on the second communication parameter scheme.

* * * * *